US011989353B2

United States Patent
Jo et al.

(10) Patent No.: US 11,989,353 B2
(45) Date of Patent: May 21, 2024

(54) BRIGHTNESS ADJUSTMENT METHOD AND HMD DEVICE

(71) Applicant: Samsung Electronics Co., Ltd., Suwon-si (KR)

(72) Inventors: Nammin Jo, Suwon-si (KR); Hyoungil Song, Suwon-si (KR); Jinchoul Lee, Suwon-si (KR); Heonjun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/073,909

(22) Filed: Dec. 2, 2022

(65) Prior Publication Data

US 2023/0106457 A1 Apr. 6, 2023

Related U.S. Application Data

(63) Continuation of application No. PCT/KR2021/007493, filed on Jun. 15, 2021.

(30) Foreign Application Priority Data

Jun. 22, 2020 (KR) .......... 10-2020-0075839

(51) Int. Cl.
*G06F 3/03* (2006.01)
*G02B 27/01* (2006.01)
(Continued)

(52) U.S. Cl.
CPC ....... *G06F 3/0308* (2013.01); *G02B 27/0172* (2013.01); *G06F 3/0346* (2013.01);
(Continued)

(58) Field of Classification Search
CPC ...... G06F 3/0308; G06F 3/0346; G06F 3/038; G06F 2203/0384; G06T 7/50; G02B 27/0172
See application file for complete search history.

(56) References Cited

U.S. PATENT DOCUMENTS 10,055,887 B1 * 8/2018 Gil .......................... G06F 1/163
10,078,377 B2   9/2018 Balan et al.
(Continued)

FOREIGN PATENT DOCUMENTS

JP    2019-092216 A    6/2019
KR    10-2010-0008353 A    1/2010
(Continued)

OTHER PUBLICATIONS

International Search Report dated Sep. 30, 2021, issued in International Application No. PCT/KR2021/007493.

*Primary Examiner* — Ariel A Balaoing
(74) *Attorney, Agent, or Firm* — Jefferson IP Law, LLP

(57) ABSTRACT

An electronic device is provided. The electronic device includes at least one processor, and a head-mounted display (HMD) device wirelessly connecting to the at least one processor. The at least one processor includes a first communication module, a light-emitting device, and a first processor for controlling the brightness of the light-emitting device based on a brightness adjustment signal received from the HMD device. The HMD device includes a second communication module, a sensor for measuring external illuminance, and a second processor for acquiring the external illuminance measured by the sensor, and, based on the obtained external illuminance, transmitting the brightness adjustment signal, for adjusting the brightness of the light-emitting device of the at least one processor, to the at least one processor by using the second communication module.

17 Claims, 7 Drawing Sheets

(51) Int. Cl.
*G06F 3/0346* (2013.01)
*G06F 3/038* (2013.01)
*G06T 7/50* (2017.01)

(52) U.S. Cl.
CPC ............... *G06F 3/038* (2013.01); *G06T 7/50* (2017.01); *G06F 2203/0384* (2013.01)

(56) References Cited

U.S. PATENT DOCUMENTS

| | | | |
|---|---|---|---|
| 10,146,335 | B2 | 12/2018 | Balan et al. |
| 10,320,480 | B2 | 6/2019 | Shim et al. |
| 10,496,157 | B2* | 12/2019 | Steedly ............... G01B 11/002 |
| 2010/0013395 | A1 | 1/2010 | Archibald et al. |
| 2016/0097868 | A1* | 4/2016 | Dicharry ............... G01V 5/02 250/336.1 |
| 2016/0361643 | A1* | 12/2016 | Allin ................... A63F 13/5255 |
| 2017/0053575 | A1 | 2/2017 | Ishikawa et al. |
| 2018/0143702 | A1 | 5/2018 | Lee et al. |
| 2018/0311571 | A1 | 11/2018 | Huang |
| 2018/0311575 | A1* | 11/2018 | Bristol .................... A63F 13/25 |
| 2018/0321493 | A1 | 11/2018 | Kim et al. |
| 2018/0329517 | A1* | 11/2018 | Steedly ................. G06F 3/0346 |
| 2018/0330521 | A1* | 11/2018 | Samples ................. G06T 7/248 |
| 2018/0373348 | A1* | 12/2018 | Price ..................... G06F 3/0312 |
| 2019/0138114 | A1* | 5/2019 | Huang ................... G06F 3/012 |
| 2019/0146598 | A1 | 5/2019 | Peri |
| 2019/0262697 | A1 | 8/2019 | Kim et al. |
| 2019/0356848 | A1 | 11/2019 | Rydberg |
| 2020/0159337 | A1 | 5/2020 | Kin et al. |
| 2020/0333878 | A1* | 10/2020 | Steedly ................... G06F 3/012 |

FOREIGN PATENT DOCUMENTS

| | | |
|---|---|---|
| KR | 10-2017-0048897 A | 5/2017 |
| KR | 10-2017-0055296 A | 5/2017 |
| KR | 10-2018-0056998 A | 5/2018 |
| KR | 10-2019-0007910 A | 1/2019 |
| KR | 10-2019-0102715 A | 9/2019 |

* cited by examiner

BRIGHTNESS ADJUSTMENT METHOD AND HMD DEVICE

CROSS-REFERENCE TO RELATED APPLICATION(S)

This application is a continuation application, claiming priority under § 365(c), of an International application No. PCT/KR2021/007493, filed on Jun. 15, 2021, which is based on and claims the benefit of a Korean patent application number 10-2020-0075839, filed on Jun. 22, 2020, in the Korean Intellectual Property Office, the disclosure of which is incorporated by reference herein in its entirety.

BACKGROUND

1. Field

The disclosure relates to a brightness adjustment method and a head-mounted device (HMD) device.

2. Description of Related Art

Augmented reality may refer to technology that combines a real space and a virtual space so that a virtual object appears to exist in the real space. Augmented reality may be derived from virtual reality that creates a virtual space similar to reality using computer graphics.

Nowadays, wearable electronic devices that may be directly worn on a body have been developed. For example, the wearable electronic device may be in a form detachable to a body part or clothes, such as an HMD, a head-mounted display (HMD), a smart watch, and a smart wristband.

The HMD device may provide a virtual large screen to a user through a display positioned in front of the user's eyes, and provide a realistic experience by enabling a screen to move along with the user's movement.

The above information is presented as background information only to assist with an understanding of the disclosure. No determination has been made, and no assertion is made, as to whether any of the above might be applicable as prior art with regard to the disclosure.

SUMMARY

A headset type HMD device for providing augmented reality to a user may identify a position of a controller using an optical camera of the HMD device or a tracker. The controller device may include a battery as an independent power source for supplying power to a light emitting element for position identification.

Further, in the case that a vibration motor for a haptic effect is provided in the controller device, it may be difficult to utilize independent power (e.g., battery) of the controller device up to a maximum capacity thereof. Further, while power consumption of the controller device is excessive, when an overcurrent flows, a malfunction of the controller device may occur, and when a maximum allowable voltage is increased to prevent a malfunction, the use of independent power may not be optimal.

Aspects of the disclosure are to address at least the above-mentioned problems and/or disadvantages and to provide at least the advantages described below. Accordingly, an aspect of the disclosure is to provide brightness adjustment method and a head-mounted device (HMD) device.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, and a head-mounted display (HMD) device wirelessly connected to the at least one processor, wherein the at least one processor includes a first communication module, a light emitting element, and a first processor configured to control brightness of the light emitting element based on a brightness adjustment signal received from the HMD device, wherein the HMD device includes a second communication module, a sensor configured to measure external illuminance, and a second processor configured to obtain external illuminance measured by the sensor and to transmit a brightness adjustment signal for adjusting brightness of the light emitting element of the at least one processor to the at least one processor using the second communication module based on the obtained external illuminance.

In accordance with another aspect of the disclosure, a method of adjusting brightness of a light emitting element disposed in at least one processor of an electronic device is provided. The method includes an HMD device and the at least one processor wirelessly connected to the HMD device, wherein the method includes acquiring, by the HMD device, external illuminance, transmitting, by the HMD device, a brightness adjustment signal for adjusting brightness of the light emitting element based on the obtained external illuminance, and controlling, by the at least one processor, brightness of the light emitting element by receiving the transmitted brightness adjustment signal.

According to various embodiments of the disclosure, a position of a at least one processor of an electronic device can be identified through an illuminance sensor and/or a camera of an HMD device and/or a tracker. Brightness of a light emitting element of the at least one processor can be adjusted based on changes in illuminance of an external environment and/or a distance to the HMD device.

Further, the HMD device capable of providing virtual reality and/or the at least one processor that has received a brightness adjustment signal from a tracker can adjust brightness of the light emitting element to prevent excessive power consumption. A battery that may be provided in the at least one processor can efficiently consume power by changing brightness of the light emitting element that consumes large amount of power according to a determined environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
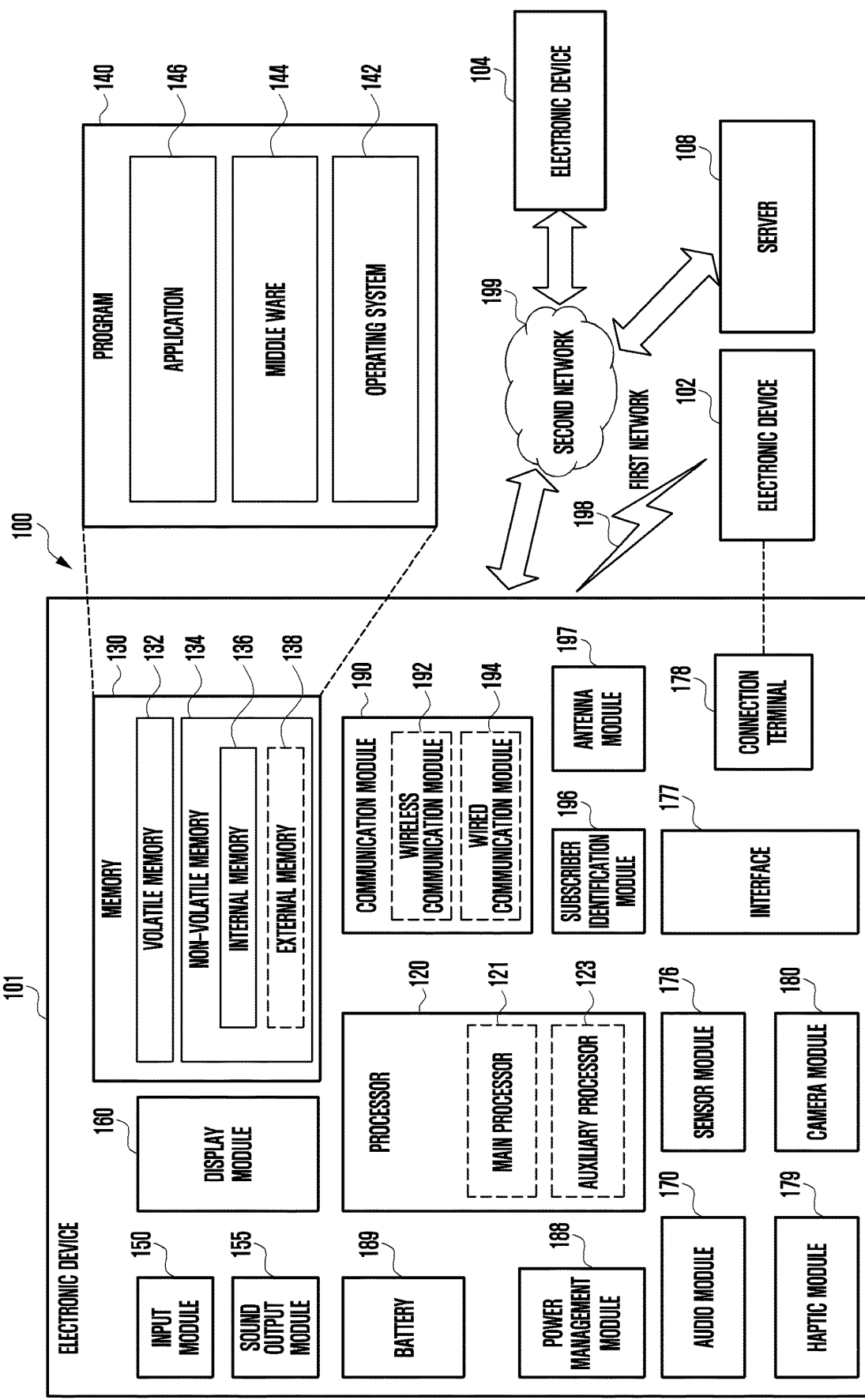
FIG. 1 is a block diagram illustrating an electronic device in a network environment according to an embodiment of the disclosure.

FIG. 1 is a block diagram illustrating an electronic device in a network environment according to embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
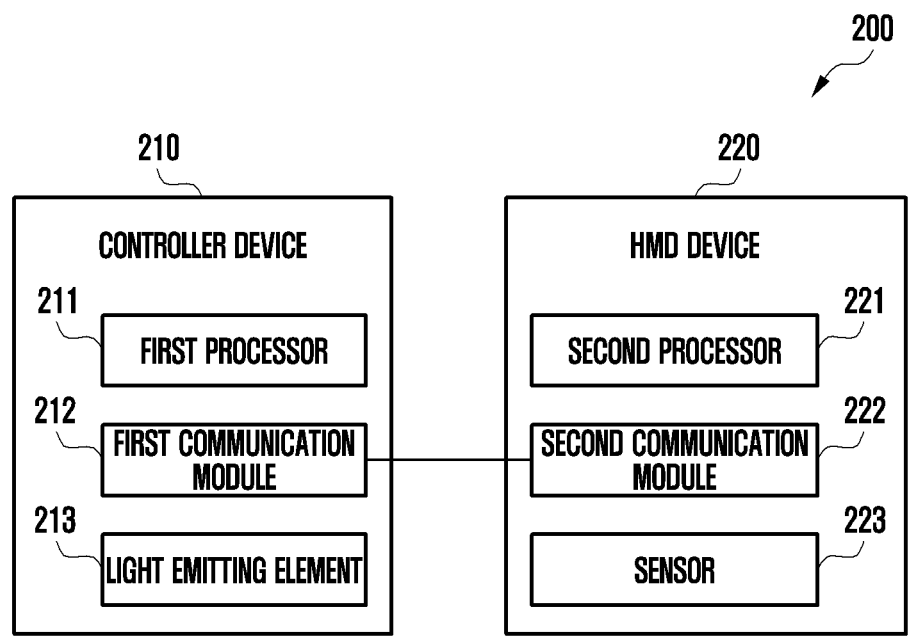
FIG. 2 is a block diagram illustrating an electronic device according to an embodiment of the disclosure.

FIG. 2 is a block diagram illustrating an electronic device according to an embodiment of the disclosure.

Referring to FIG. 2, an electronic device 200 (e.g., the electronic device 101 of FIG. 1) may include a controller device 210 and an HMD device 220 and include at least a part of a structure and/or function of the electronic device 101 of FIG. 1. The electronic device 200 may include various types of devices capable of providing virtual reality. According to an embodiment of the disclosure, the electronic device 200 may include a controller device and an HMD device capable of providing virtual reality by inside-out. According to another embodiment of the disclosure, the electronic device 200 may include a controller device, an HMD device, and a tracker by outside-in.

Referring to FIG. 2, the controller device 210 may include a first processor 211 (e.g., the processor 120 of FIG. 1), a first communication module 212 (e.g., the communication module 190 of FIG. 1), and a light emitting element 213. The controller device 210 may include at least a part of a structure and/or function of the electronic device 101 of FIG. 1, and components of the controller device illustrated in FIG. 2 may be omitted or replaced with other components and are not limited to only the illustrated components.

The controller device 210 may receive a brightness adjustment signal transmitted from the HMD device 220 and/or the tracker using the first communication module 212. Further, the first processor 211 of the controller device 210 may identify a movement of the controller device detected through a sensor, and transmit a result identified by the HMD device 220 and/or the tracker using the first communication module 212. When the electronic device 200 plays a content, the controller device 210 may control a movement on the content to provide a moving experience in a virtual space to a user of the electronic device. Further, the controller device 210 may be mounted on, attached to, or provided on the electronic device user's hand, wrist, or clothing and provide an experience in which in which the control is performed at a provided position.

The first processor 211 is a component capable of performing an operation or data processing related to the control and/or communication of each component of the controller device 210, and may include at least a part of the constitution and/or function of the processor 120 of FIG. 1. The first processor 211 may be connected functionally, operatively and/or electrically with the internal components of the controller device including the first communication module 212 and the light emitting element 213.

According to various embodiments of the disclosure, the first processor 211 may adjust brightness of the light emitting element 213 based on a brightness adjustment signal received through the first communication module 212. There may be one or more methods for the first processor 211 to adjust brightness of the light emitting element 213. For example, the brightness adjustment method may be performed by adjusting the intensity of a current flowing to the light emitting element or turning on or off power of each light emitting element.

According to various embodiments of the disclosure, the first processor 211 may execute instructions related to a gesture stored in a memory (not illustrated) that may be included in the controller device 210. According to another embodiment of the disclosure, the first processor 211 may detect a movement of the controller device 210 through a sensor (not illustrated). The first processor 211 may transmit data related to the detected movement of the controller device 210 to the HMD device 220 and/or the tracker using the first communication module 212. In this way, when the movement of the controller device 210 is transmitted, a pointer, a selection operation, a gesture, and the like corresponding to the controller device 210 may be input on a content being executed.

According to various embodiments of the disclosure, in order to identify an initial position of the controller device 210, the first processor 211 may adjust brightness of the light emitting element 213 to a maximum value. The initial position of the controller device 210 may be identified through a camera and/or sensor of the HMD device 220 and/or the tracker. According to another embodiment of the disclosure, in order to identify an initial position of the controller device 210, the first processor 211 may control the light emitting element 213 to flicker.

According to various embodiments of the disclosure, the first communication module 212 may be connected by wireless communication. The first communication module 212 may be wirelessly connected with a second communication module 222 of the HMD device 220 to receive a brightness adjustment signal and/or control commands from the HMD device 220 and/or the tracker. According to another embodiment of the disclosure, the first communication module 212 may transmit a signal for reflecting data related to the movement of the controller device 210 to a content being executed. The first communication module 212 and the second communication module 222 may be wirelessly connected to transmit and receive control commands of the first processor 211 and a second processor 221. The first communication module 212 may include at least a part of the constitution and/or function of the communication module 190 of FIG. 1.

According to various embodiments of the disclosure, the light emitting element 213 may be provided in a partial region of the controller device 210. The light emitting element 213 may include at least one, for example, in the case that the controller device 210 is formed in a ring shape in a hand-held form, the controller device 210 may be provided with a plurality of light emitting elements 213 enclosing the ring portion. According to an embodiment of the disclosure, brightness of all of the plurality of light emitting elements 213 may be adjusted at once, or brightness of the light emitting elements 213 may be adjusted in a manner in which the brightness is adjusted by turning on/off some and/or all of the light emitting elements 213.

Referring to FIG. 2, the HMD device 220 may include a second processor 221 (e.g., the processor 120 of FIG. 1), a second communication module 222 (e.g., the communication module 190 of FIG. 1), and a sensor 223 (e.g., the sensor module 176 of FIG. 1). The HMD device 220 may include at least a part of the structure and/or function of the electronic device 101 of FIG. 1. The HMD device 220 is not limited to only the components illustrated in FIG. 2, and the illustrated components may be omitted or replaced with other components.

The HMD device 220 may be provided in various forms and worn on a part of the user's body. For example, the HMD device 220 may be in close contact with the user's face around eyes, including a band formed with an elastic material. According to another embodiment of the disclosure, the HMD device 220 may be produced in the form of eyeglasses, a helmet, or a strap.

According to various embodiments of the disclosure, the second processor 221 is a component capable of performing an operation or data processing related to the control and/or communication of each component of the HMD device 220, and may include at least a part of the constitution and/or function of the processor 120 of FIG. 1. The second processor 221 may be functionally, operatively, and/or electrically connected to internal components of the HMD device including the second communication module 222 and the sensor 223.

According to various embodiments of the disclosure, the second processor 221 may transmit a brightness adjustment signal for adjusting brightness of the light emitting element 213 of the controller device 210 using the second communication module 222. The HMD device 220 may be connected to the controller device 210 through wireless communication. The second processor 221 of the HMD device 220 may control to be wirelessly connected with the controller device 210 through the second communication module 222. In this case, the first communication module 212 of the controller device 210 and the second communication module 222 of the HMD device connected through wireless communication may be connected without limitation as long as they may be connected by wireless communication. For example, the first communication module 212 and the second communication module 222 may be wirelessly communicated through Bluetooth, Bluetooth low energy (BLE), near field communication (NFC), and the like.

According to various embodiments of the disclosure, the second communication module 222 may be connected by wireless communication. The second communication module 222 may be wirelessly connected with the first communication module 212 of the controller device 210 to transmit a brightness adjustment signal and/or control command from the HMD device 220 and/or the tracker to the controller device 210. According to another embodiment of the disclosure, the second communication module 222 may receive a signal for reflecting a movement of the controller device to a content being executed from the movement of the controller device 210. The first communication module 212 and the second communication module 222 may be wirelessly connected to transmit and receive control commands of the first processor 211 and the second processor 221. The second communication module 222 may include at least a part of the constitution and/or function of the communication module 190 of FIG. 1.

According to various embodiments of the disclosure, the sensor 223 may include at least a part of the constitution and/or function of the sensor module 176 of FIG. 1.

Figure 3:
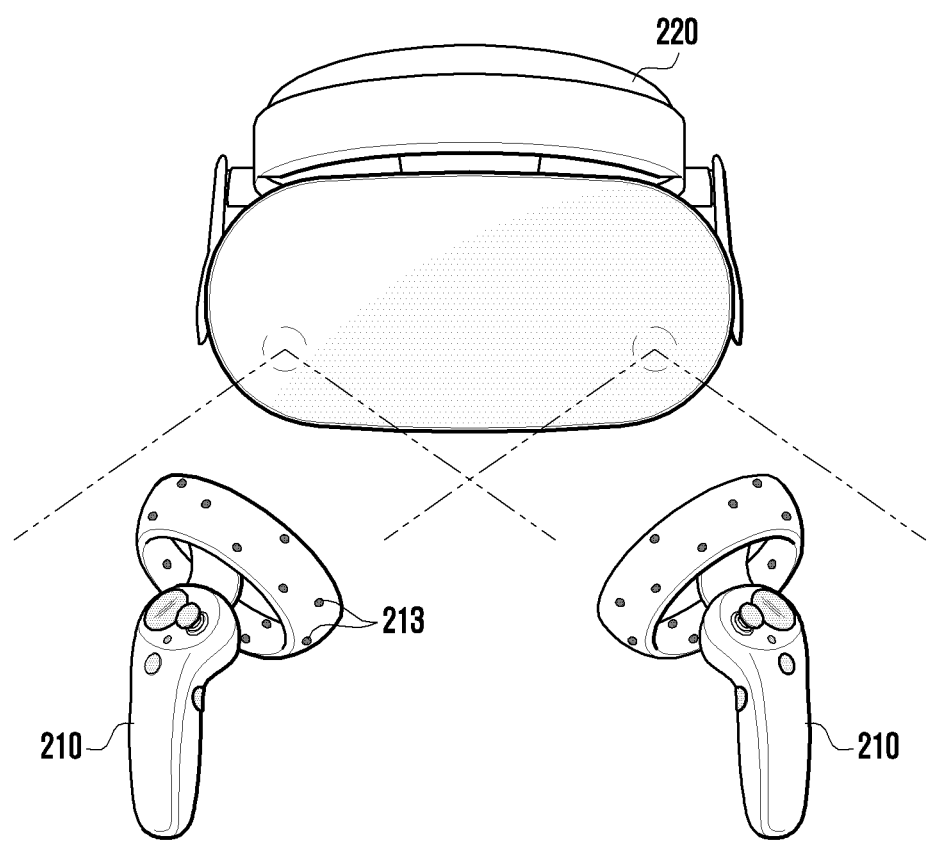
FIG. 3 is a diagram illustrating use of an electronic device according to an embodiment of the disclosure.

FIG. 3 is a diagram illustrating use of an electronic device according to an embodiment of the disclosure.

Referring to FIG. 3, the HMD device 220 may include a plurality of cameras. For example, a camera that may be provided in the HMD device 220 may be an optical camera, and any camera capable of detecting brightness of the light emitting element 213 of the controller device 210 may be used. Further, the camera of the HMD device 220 may be used for identifying an initial position of the controller device 210. For example, the camera may be configured to identify a position of the controller device initially connected by wireless communication with the controller device 210 through 6 DoF (degrees of freedom) recognized in the form of a coordinate system. In this case, at least one of a maximum value of brightness of a light emitting element of the controller device, blinking, or a distance may be identified by the camera.

FIG. 3 is a diagram illustrating an inside-out method in which a camera provided in the HMD device 220 may handle a content together with the controller device 210. A method of operating the electronic device of the disclosure is not limited to the method illustrated in FIG. 3, and an outside-in method using a camera of a separate tracker that may be installed in a ceiling or the like may also be utilized. Further, the electronic device of the disclosure may be an electronic device that utilizes both methods.

Referring to FIG. 3, in order to efficiently control power consumed by the light emitting element 213 of the controller device 210, a user of the electronic device 200 may perform a process of identifying an initial position of the controller device 210. For example, brightness of the light emitting element of the controller device 210 may be adjusted to a maximum value, the light emitting element may flicker, or an initial position of the controller device 210 may be identified through a coordinate system. In the case that brightness or a position of the light emitting element 213 is changed based on the identified position of the controller device 210, the electronic device 200 may be configured to adjust brightness of the light emitting element 213 for minimum power consumption.

Figure 4:
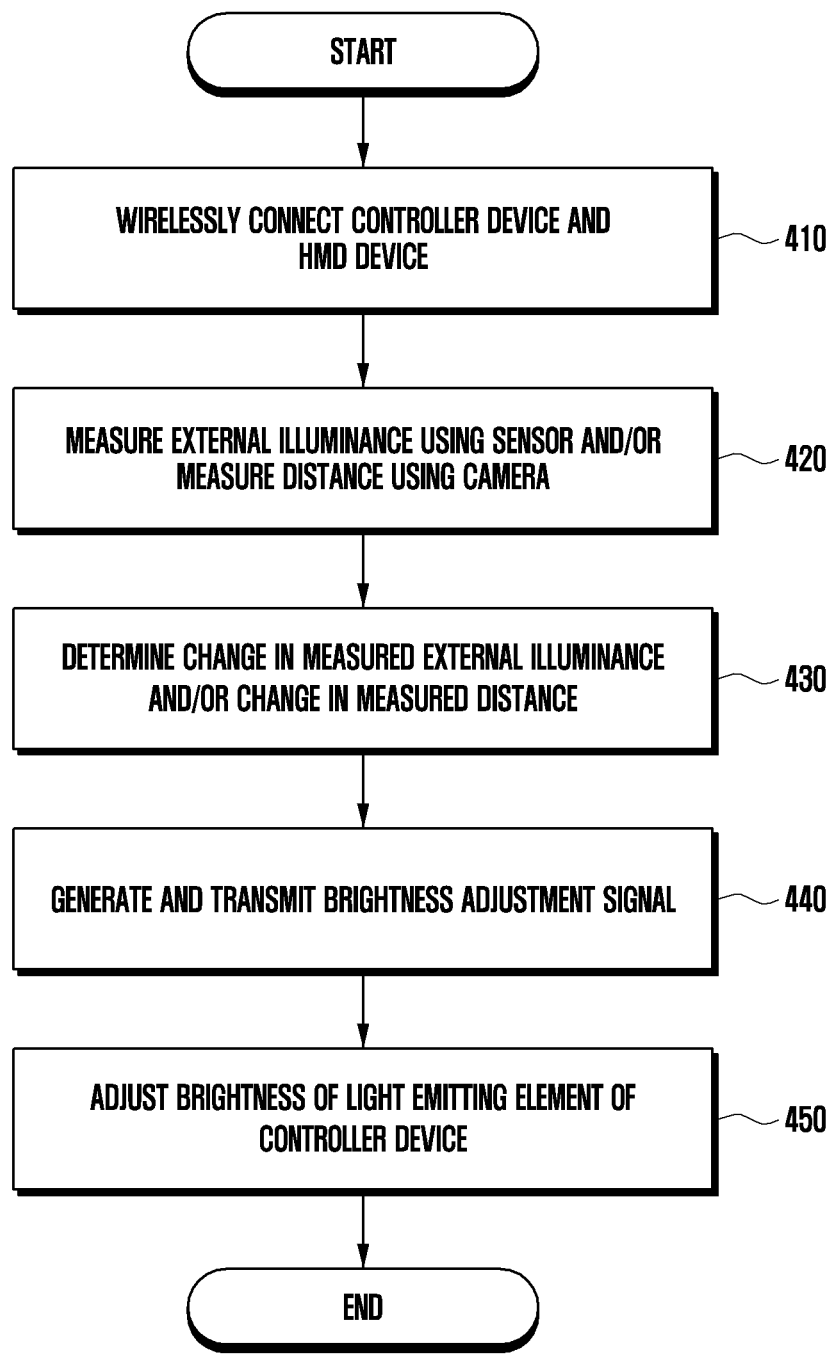
FIG. 4 is a flowchart illustrating an operation of a brightness adjustment method according to an embodiment of the disclosure.

FIG. 4 is a flowchart illustrating an operation of a brightness adjustment method according to an embodiment of the disclosure.

Referring to FIG. 4, operation 410 may be a process in which the controller device 210 and the HMD device 220 are wirelessly connected. For example, operation 410 may correspond to connecting by wireless communication between the first communication module 212 of the controller device 210 and the second communication module 222 of the HMD device 220. Here, a method of connecting by wireless communication may be any method capable of connecting two devices positioned in a short distance, and two devices may be connected by Bluetooth or the like.

Referring to FIG. 4, operation 420 may be a measurement process of external illuminance through the sensor 223 of the HMD device 220 and/or a separate tracker and/or a distance measurement process through a camera of the HMD device 220 and/or a separate tracker. According to an embodiment of the disclosure, the sensor 223 of the HMD device 220 may detect illuminance regarding an external environment of the electronic device 200. According to another embodiment of the disclosure, a camera or an optical camera that may be included in the HMD device 220 may measure a distance between the HMD device and the controller device by identifying a position of the controller device 210. Distance measurement using a camera may include an operation process of a processor through a coordinate system of 6 DoF (degrees of freedom) through an image received through the camera.

According to various embodiments of the disclosure, in operation 420, a distance and/or direction of the HMD device 220 and the controller device 210 and a distance and/or direction of the HMD device 220, the controller device 210, and the tracker may be measured by at least one method. Here, the sensor 223 may include an ultra-wide band sensor (UWB sensor), an ultrasonic sensor, a geomagnetic sensor, and the like, and any type of sensor capable of sensing a peripheral environment may be included in the device. For example, an included UWB sensor may measure a relative distance and/or direction to an external device using a broadband.

Referring to FIG. 4, operation 430 may be a process of determining a change in the measured illuminance of the external environment and/or a change in the measured distance between the HMD device 220 and the controller device 210. In this way, operation 430 may be performed to efficiently consume power through the light emitting element 213 of the controller device 210 using the processor (e.g., the second processor 221 of FIG. 2). In the case that there is a change in illuminance of the external environment and/or a change in the distance of the controller device, brightness of the light emitting element may be adjusted to be bright or dark based on the initially identified position of the controller device. For example, after initial position identification of the controller device, a tracking range of the controller device may be narrowly configured through a camera or sensor of the I-MD device. Further, the effect of improving current consumption may be obtained by reducing brightness of the light emitting element after narrowing the tracking range.

According to various embodiments of the disclosure, in operations 420 and 430, illuminance measurement of an external environment by the HMD device, the controller device, and/or the tracker may reduce power consumption of individual devices. For example, the HMD device may be configured to perform an initial searching step for communication connection with the controller device. In this case, the H-MD device may determine a relative position and/or direction of the controller device by searching the light emitting elements (e.g., a plurality of LEDs) of the controller device. In the case that illuminance of the external environment is high (e.g., bright), brightness of the light emitting element of the controller device may be configured to maintain brightness of the maximum value in order to distinguish from other peripheral objects. According to another embodiment of the disclosure, in the case that illuminance of the external environment is low (e.g., dark), even if brightness of the light emitting element of the controller device is not the maximum value, but brightness of the light emitting element may be configured to be distinguished from peripheral objects. In this case, brightness of the light emitting element of the controller device may be configured to be lower than the maximum value according to the measured illuminance of the external environment.

According to an embodiment of the disclosure, the HMD device and/or the tracker may transmit a signal capable of adaptively adjusting brightness of the light emitting element of the controller device according to the measured illuminance of the external environment. In this way, the brightness adjustment signal of the HMD device and/or the tracker may be generated by a processor of an individual device, and brightness at which the light emitting element of the controller device may be searched according to illuminance of the external environment may be stored in the memory as data formed with a table. According to another embodiment of the disclosure, in the memory of the HMD device and/or the tracker, brightness data for adjusting brightness of the light emitting element of the controller device may be stored as an experimental value. The experimental value may be, for example, brightness of the identifiable light emitting element of the controller device according to illuminance of an external environment that may be detected through a sensor and/or a camera of the HMD device and/or the tracker. A brightness value of a light emitting element that may be distinguished from other objects according to arbitrary external environment illuminance may be stored, and brightness of the light emitting element may have different detailed specifications for each product that may be formed with an element.

With reference to FIG. 4, operation 440 may correspond to a process of generating and transmitting a signal for adjusting brightness of the light emitting element 213 from the HMD device 220 or a separate tracker to the controller device 210. For example, in the case that a distance between the HMD device 220 and the controller device 210 is measured, and in the case that a distance between the two devices 210 and 220 is positioned close to each other based on an initially identified position, an adjustment signal that lowers brightness of the light emitting element may be generated and transmitted, and in the case that the distance between the two devices 210 and 220 increases, an adjustment signal that increases brightness may be generated and transmitted.

Referring to FIG. 4, operation 450 may correspond to a process of adjusting brightness of the light emitting element 213 of the controller device 210. For example, the controller device 210 may adjust brightness of the light emitting element based on a brightness adjustment signal of the light emitting element received from the HMD device 220 or a separate tracker. According to an embodiment of the disclosure, the controller device 210 may be formed as a set of two, and each may include a plurality of light emitting elements of 15. In this case, brightness of the entire light emitting element may be adjusted in a manner in which only 5 of light emitting elements of the controller device maintain the existing brightness (e.g., maximum value) and in which the remaining 10 light emitting elements are darker than the existing brightness. According to another embodiment of the disclosure, brightness of the entire light emitting element may be adjusted by turning on/off some of the plurality of light emitting elements according to a gaze direction of the camera of the HMD device 220 or a user wearing the HMD device. In this case, when the HMD device views the controller device, if some of the light emitting elements of the controller device are not visible, the invisible light emitting elements may be turned off to adjust brightness of the entire light emitting element.

Figure 5:
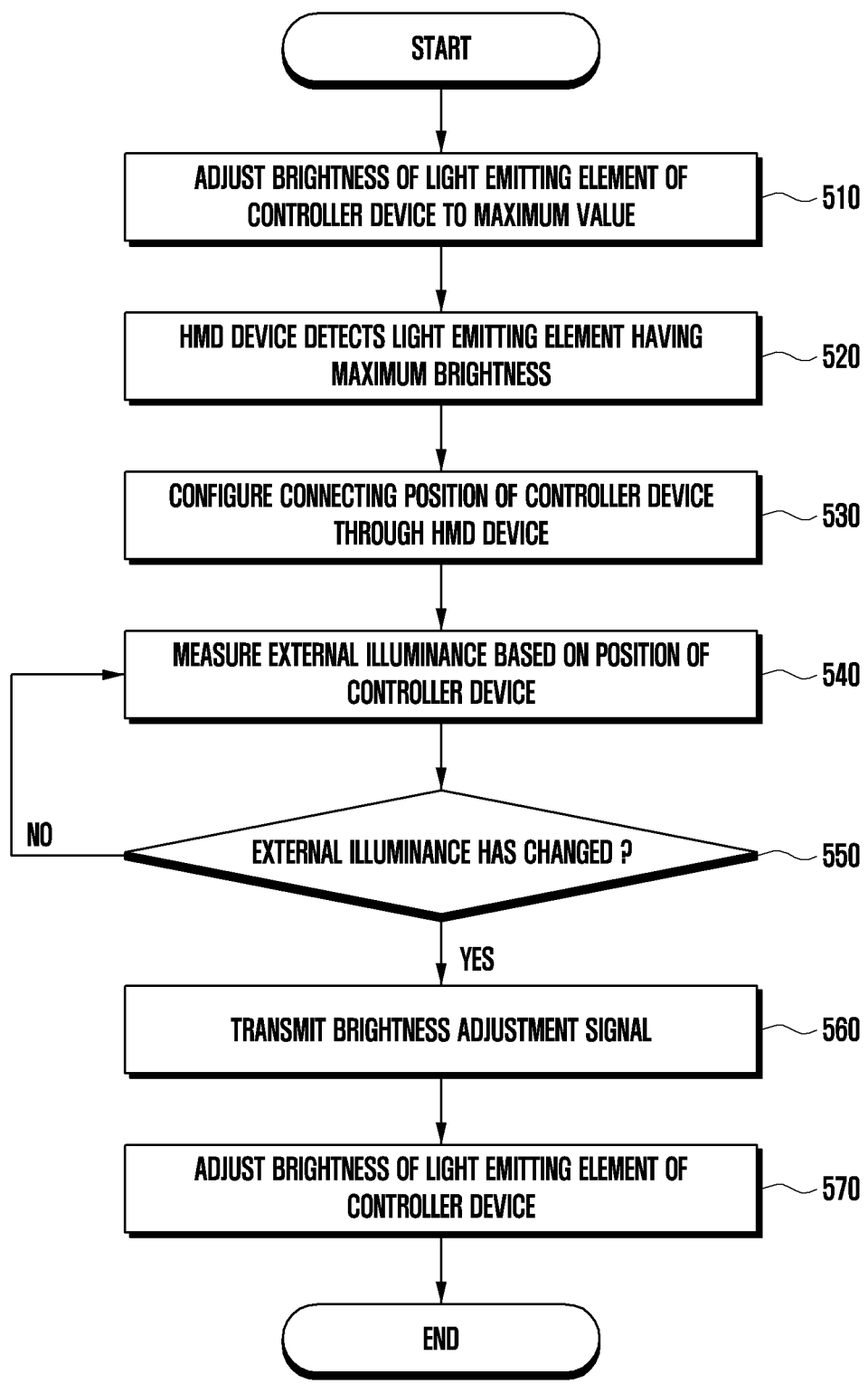
FIG. 5 is a flowchart illustrating an operation of a brightness adjustment method according to an embodiment of the disclosure.

FIG. 5 is a flowchart illustrating an operation of a brightness adjustment method according to an embodiment of the disclosure.

Referring to FIG. 5, operation 510 may correspond to a process of adjusting brightness of the light emitting element 213 of the controller device 210 to a maximum value. For example, when initially booting the electronic device 200 or when reuse of the electronic device 200 is recognized, for position identification of the controller device 210, the first processor 211 may control to adjust brightness of the light emitting element to a maximum value. Further, the first processor 211 may control to identify a position of the controller device by adjusting brightness of the light emitting element to a maximum value or controlling the light emitting element to blink.

Referring to FIG. 5, operation 520 may correspond to a process in which the HMD device 220 detects the light emitting element having the maximum brightness. For example, the HMD device 220 and/or a separate tracker may detect the maximum brightness and/or flickering of the light emitting element of the controller device 210 to identify an initial connection position of the controller device. In this case, the initial connection position may correspond to a connecting position, and connecting may correspond to initial booting, rebooting, or reuse after a power saving mode of the electronic device. According to an embodiment of the disclosure, in a process for communication connection between the HMD device 220 and the controller device 210, it may be configured to perform a search for identifying a light emitting element of the controller device. In a memory of the HMD device and/or the tracker, brightness data for adjusting brightness of the light emitting element of the controller device may be stored as an experimental value. The experimental value may be, for example, brightness of the identifiable light emitting element of the controller device according to illuminance of an external environment that may be detected through a sensor and/or a camera of the HMD device and/or the tracker. According to another embodiment of the disclosure, a maximum brightness configuration value of the light emitting element of the controller device 210 may be changed according to illuminance of the external environment. Because the maximum value of brightness of the light emitting element may be a value configured by the user, it is only configured to the maximum value and may not be the maximum value of brightness according to the specification of the light emitting element. This is configured to the maximum value, and a value larger than a maximum value of illuminance of an external environment (e.g., a place in which the HMD device, the controller device is installed) may be sufficient. In this way, when the value is configured to be larger than illuminance of the external environment, the light emitting element of the controller device may be identified; thus, a configuration value of the maximum brightness of the light emitting element may be changed according to illuminance of the external environment.

With reference to FIG. 5, operation 530 may correspond to a process of configuring a connecting position of the controller device 210 through the HMD device 220. The connecting position of the controller device 210 may be configured by the HMD device 220 or by a separately installed external device (e.g., tracker).

Referring to FIG. 5, operation 540 may correspond to a process of measuring external illuminance based on the connecting position of the controller device 210. For example, the HMD device 220 and/or a separate tracker may identify a connecting position of the controller device 210 and measure illuminance of the electronic device 200 with respect to the external environment. Further, in addition to illuminance measurement of the external environment, the distance between the HMD device and the controller device may be measured, and the distance may be measured together with illuminance measurement of the external environment. In this way, identifying the connecting position and measuring illuminance of the external environment and/or the distance between devices may be to efficiently consume power by adjusting brightness of the light emitting element 213 according to the change in illuminance and/or the distance by narrowing a tracking range after connecting.

According to various embodiments of the disclosure, operation 540 illustrated in FIG. 5 may be operation of measuring external illuminance after identifying a connecting position of the controller device, and correspond to a preceding operation for adjusting brightness of a light emitting element of the controller device. The connecting position of the controller device may be changed in real time by a movement of the electronic device user (e.g., movement of the controller device), and the HMD device may be wirelessly connected with the controller device to identify a connecting position of the controller device changed in real time. By identifying the connecting position of the controller device, it may be configured to measure illuminance of the external environment in the HMD device and/or the tracker. In this case, a tracking range of the light emitting element of the controller device may be configured to narrow to the periphery of the identified connecting position. Further, because brightness of the light emitting element is adjusted by measuring illuminance of the external environment, external illuminance (e.g., illuminance around the controller device) according to the narrowed tracking range may be measured to be used for adjusting brightness of the light emitting element. According to an embodiment of the disclosure, illuminance in a peripheral range of the connecting position may be measured by identifying the updated connecting position of the controller device.

With reference to FIG. 5, operation 550 may correspond to a process of detecting whether illuminance of the external environment of the electronic device 200 has changed. For example, the second processor 221 may detect a change in illuminance of an external environment of the electronic device and/or a change in a distance between the devices through a camera and/or a sensor of the HMD device 220. In the case that the second processor 221 detects a change in illuminance of the external environment and/or a change in a distance between devices, the process may continue at operation 560 and otherwise, the process may return to operation 540 and operation 540 may be repeated.

Referring to FIG. 5, operation 560 may correspond to a process in which the brightness adjustment signal generated in the second processor 221 is transmitted to the controller device 210. For example, the second processor 221 may transmit a brightness adjustment signal for adjusting the overall brightness of the light emitting element 213 of the controller device 210 to the controller device through the second communication module 222.

Referring to FIG. 5, operation 570 may correspond to a process in which the first processor 211 adjusts brightness of the light emitting element 213 of the controller device 210 based on the brightness adjustment signal received from the HMD device 220 through the first communication module 212. For example, the overall brightness of the light emitting element 213 of the controller device 210 may be adjusted to be bright or dark by turning on/off some light emitting elements of a plurality of light emitting elements or by adjusting the intensity of a current.

Figure 6:
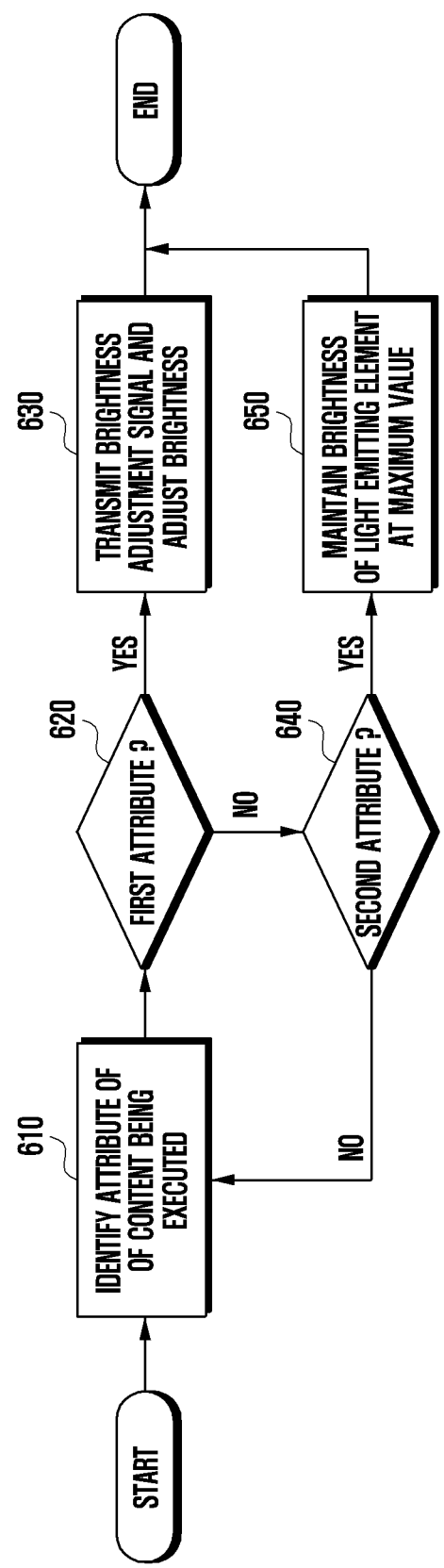
FIG. 6 is a flowchart illustrating an operation according to a content attribute of a brightness adjustment method according to an embodiment of the disclosure.

FIG. 6 is a flowchart illustrating an operation according to a content attribute of a brightness adjustment method according to an embodiment of the disclosure.

According to various embodiments of the disclosure, a device for expressing augmented reality or virtual reality may require different sensing sensitivity according to a content (e.g., application) being played. For example, in the case that a game application is executed, because complex graphics and detailed control are required, sensing needs to be performed relatively sensitively. According to another embodiment of the disclosure, in the case of controlling a home screen, sensing less sensitive than that of execution of the game application may be sufficient. A type of content described in the disclosure may be described as a first attribute and a second attribute, and a content attribute may be assigned according to required sensing. For example, a content that does not require detailed sensing, such as a home screen, may be classified as a first attribute, and a content that requires more detailed sensing, such as a game application, may be classified as a second attribute.

Referring to FIG. 6, operation 610 may correspond to a process of identifying which attribute of a content being executed corresponds to. For example, an attribute of a content being executed through the electronic device 200 may be preconfigured when initially provided through purchase of the electronic device. According to another embodiment of the disclosure, an attribute of the content may be received and updated in the electronic device 200 based on data of other electronic devices accumulated in an external server, a cloud, or the like. Information on an attribute of a content executed in the electronic device 200 may be stored or updated in the electronic device without limitation in a method.

Referring to FIG. 6, operations 620 and 640 may be a process of identifying whether an attribute of a content being executed through the electronic device 200 corresponds to a preconfigured first attribute or second attribute. For example, processes of 610, 620, and 640 of identifying an attribute of a content being executed may be processes of first identifying whether a currently executing content corresponds to a content of the first attribute, and proceeding to operation 640 and identifying whether a currently executing content corresponds to the second attribute in the case that a currently executing content does not correspond to a content of the first attribute. According to another embodiment of the disclosure, unlike FIG. 6, the process may proceed to a process of identifying whether a currently executing content corresponds to the first attribute after first identifying whether a currently executing content corresponds to the second attribute. There is no priority on an attribute in a process of identifying whether a content being executed through the electronic device 200 corresponds to the preconfigured first attribute or second attribute, and the process may be arbitrarily changed other than the illustrated order, and be extended to a third attribute, a fourth attribute, an n-th attribute, and the like.

Referring to FIG. 6, operation 630 may be a process of adjusting brightness of the light emitting element 213 of the controller device 210 by transmitting a brightness adjustment signal generated through the second processor 221 through the second communication module 222.

Referring to FIG. 6, operation 650 may correspond to a process of maintaining brightness of the light emitting element 213 at the maximum value. For example, in the case that brightness of the light emitting element of the controller device 210 is adjusted to the maximum value in operation 510 of FIG. 5, the content of the second attribute may correspond to a content requiring detailed sensing. Here, when the content of the second attribute corresponds to a game application and requires sensitive sensing, operation 650 may be performed because it is not necessary to darken brightness of the light emitting element adjusted to the maximum value.

Figure 7:
FIG. 7 is a diagram illustrating a method of adjusting brightness of a controller device according to a direction in which a head-mounted device (HMD) device faces according to an embodiment of the disclosure.

FIG. 7 is a diagram illustrating a method of adjusting brightness of a controller device according to a direction in which an HMD device faces according to an embodiment of the disclosure.

Referring to FIG. 7, brightness of a light emitting element of the controller device may be adjusted according to a gaze direction of a user wearing the HMD device 220 or a viewing direction of a camera of the HMD device. For example, current consumption may be improved by turning on/off the light emitting element according to the direction in which the HMD device 220 views the controller device 210. When the camera of the HMD device 220 views the controller device, some of the plurality of light emitting elements may be positioned in an invisible place. In this case, the processor of the HMD device may detect that some light emitting elements are invisible through a camera or a sensor, generate a brightness adjustment signal and transmit the brightness adjustment signal to the controller device to turn off the invisible light emitting element.

According to another embodiment of the disclosure, the second processor 221 of the HMD device 220 or a processor of a separate tracker may predict the user's next action according to a content being executed to adjust brightness of the light emitting element 213 of the controller device 210. For example, the processor may predict a current state and a next state of the content being executed, and predict a direction in which the camera of the HMD device views according to the user's action. The processor may adjust brightness by turning oil/off in advance an invisible light emitting element based on such a prediction. When the user's action of the electronic device corresponding to the content is repeatedly performed several times, the second processor 221 may determine the user's action order for the content. For example, the user's action order corresponding to a content progress scenario by executing a game content may be repeated. The second processor 221 may be configured to turn on only the light emitting element visible in the HMD device 220 among the light emitting elements 213 of the controller device 210 and to turn off the hidden light emitting element based on the user's action order. The light emitting element visible or invisible in the HMD device may correspond to a direction in which the camera of the HMD device faces and may be a light emitting element that can or cannot be detected through a sensor of the HMD device. According to an embodiment of the disclosure, the second processor 221 may determine a moving direction of the controller device 210 according to the user's action order. For example, the second processor 221 may adjust brightness by turning on some of all light emitting elements 213 according to a movement of the controller device 210 and turning off some hidden light emitting elements 213 according to the movement.

According to an embodiment of the disclosure, the light emitting element 213 may be disposed in a ring shape of the controller device 210. For example, the controller device may be formed with a rod portion at a position gripped by a hand and a ring-shaped head portion in which a light emitting element may be disposed. The light emitting element may be detected through the camera and/or the sensor of the HMD device 220 while being positioned at a head portion of the controller device. The processor of the HMD device may detect the light emitting element of the controller device through the camera and/or the sensor to adjust brightness of the plurality of light emitting elements corresponding to the movement of the controller device. For example, the processor may adjust to turn off some light emitting elements disposed at positions that cannot be detected through the camera and/or the sensor of the HMD device corresponding to the direction in which the controller device moves.

According to an embodiment of the disclosure, it may be assumed that the plurality of light emitting elements are disposed in the ring-shaped head portion of the controller device in order of A, B, C, D, E, and F. When the light emitting elements detected by the camera and/or the sensor of the HMD device are C and D, brightness may be adjusted by turning on only C and D and turning off the remaining light emitting elements. According to another embodiment of the disclosure, light emitting elements that may be detected in the next state of a state in which only C and D are turned on may be B or D around C, or C or E around D. In this case, the processor of the HMD device may transmit a brightness adjustment signal that turns on only the light emitting elements of B, C, D, and E, which may be in the next state (e.g., the next state corresponding to the movement of the controller device) in which only C and D are turned on. According to another embodiment of the disclosure, the next state of a state in which only D and E are turned on may be a state in which some or all of C, D, E, and F are turned on. In this case, the processor of the HMD device may transmit a brightness adjustment signal that turns on only the light emitting elements of C, D, E, and F, which may be in the next state in which only the light emitting elements of D and E are turned on.

An electronic device according to various embodiments of the disclosure may include a controller device; and a head-mounted display (HMD) device wirelessly connected to the controller device, wherein the controller device may include a first communication module; a light emitting element; and a first processor configured to control brightness of the light emitting element based on a brightness adjustment signal received from the HMD device, wherein the HMD device may include a second communication module; a sensor configured to measure external illuminance; and a second processor configured to obtain external illuminance measured by the sensor and to transmit a brightness adjustment signal for adjusting brightness of the light emitting element of the controller device to the controller device using the second communication module based on the obtained external illuminance.

In the electronic device according to various embodiments of the disclosure, the HMD device may further include a camera, and wherein the second processor may be configured to measure a distance to the controller device using the camera, and to transmit the brightness adjustment signal further based on the measured distance.

In the electronic device according to various embodiments of the disclosure, the first processor may be configured to adjust brightness of the light emitting element to a maximum value when configuring a connecting position of the controller device, and the second processor may be configured to detect brightness of the light emitting element adjusted to the maximum value to identify a position of the controller device.

In the electronic device according to various embodiments of the disclosure, the second processor may be configured to measure external illuminance using the sensor further based on the identified position of the controller device, and to transmit a brightness adjustment signal by acquiring the measured external illuminance.

In the electronic device according to various embodiments of the disclosure, the second processor may be configured to identify an attribute of a content being executed, and to transmit the brightness adjustment signal in the case of a predetermined first attribute.

In the electronic device according to various embodiments of the disclosure, the second processor may be configured to identify an attribute of a content being executed, and to maintain brightness of the light emitting element of the controller device at the maximum value in the case of a predetermined second attribute.

In the electronic device according to various embodiments of the disclosure, the controller device may include a plurality of light emitting elements, and the first processor may be configured to adjust brightness of at least a part of the plurality of light emitting elements based on the brightness adjustment signal.

In the electronic device according to various embodiments of the disclosure, the first processor may be configured to turn off at least a part of the plurality of light emitting elements based on the brightness adjustment signal.

In the electronic device according to various embodiments of the disclosure, the controller device may include a plurality of light emitting elements, and the second processor may be configured to recognize at least a part of the plurality of light emitting elements using the camera, and to transmit a brightness adjustment signal that enables to maintain brightness of at least one light emitting element recognized using the camera and to adjust brightness of at least one unrecognized light emitting element.

In the electronic device according to various embodiments of the disclosure, the first processor may be configured to flicker the light emitting element when configuring a connecting position of the controller device, and the second processor may be configured to detect the flickered light emitting element to identify a position of the controller device.

A method of adjusting brightness of a light emitting element disposed in a controller device of an electronic device according to various embodiments of the disclosure, wherein the electronic device may include an head-mounted display (H-JMD) device and the controller device wirelessly connected to the HMD device, wherein the method may include acquiring, by the HMD device, external illuminance; transmitting, by the HMD device, a brightness adjustment signal for adjusting brightness of the light emitting element based on the obtained external illuminance; and controlling, by the controller device, brightness of the light emitting element by receiving the transmitted brightness adjustment signal.

In the method of adjusting brightness of a light emitting element disposed in a controller device of an electronic device according to various embodiments of the disclosure, transmitting a brightness adjustment signal may include measuring, by the HMD device, a distance to the controller device using a camera; and transmitting, by the HMD device, a brightness adjustment signal using a communication module further based on the measured distance.

In a method of adjusting brightness of a light emitting element disposed in a controller device of an electronic device according to various embodiments of the disclosure, the method may further include configuring, by the HMD device, a connecting position of the controller device, wherein configuring a connecting position may include adjusting, by the controller device, brightness of the light emitting element to a maximum value; and identifying, by the HMD device, a position of the controller device by detecting brightness of the light emitting element adjusted to the maximum value.

In the method of adjusting brightness of a light emitting element disposed in a controller device of an electronic device according to various embodiments of the disclosure, transmitting a brightness adjustment signal may include measuring, by the HMD device, external illuminance using a sensor further based on the identified position of the controller device; and transmitting, by the H-MD device, the brightness adjustment signal by acquiring the measured external illuminance.

In the method of adjusting brightness of a light emitting element disposed in a controller device of an electronic device according to various embodiments of the disclosure, transmitting a brightness adjustment signal may include identifying, by the HMD device, an attribute of an content being executed; and transmitting, by the HMD device, the brightness adjustment signal in the case that the identified attribute of the content is a predetermined first attribute.

In the method of adjusting brightness of a light emitting element disposed in a controller device of an electronic device according to various embodiments of the disclosure, the method may further include identifying, by the HMD device, an attribute of a content being executed; and maintaining, by the controller device, brightness of the light emitting element at the maximum value in the case that the identified attribute of the content is a predetermined second attribute.

In the method of adjusting brightness of a light emitting element disposed in a controller device of an electronic device according to various embodiments of the disclosure, controlling brightness may include controlling, by the controller device, brightness of at least a part of the plurality of light emitting elements based on the received brightness adjustment signal.

In the method of adjusting brightness of a light emitting element disposed in a controller device of an electronic device according to various embodiments of the disclosure, controlling brightness may include turning off, by the controller device, at least a part of the plurality of light emitting elements based on the received brightness adjustment signal.

In the method of adjusting brightness of a light emitting element disposed in a controller device of an electronic device according to various embodiments of the disclosure, transmitting a brightness adjustment signal may include recognizing, by the HMD device, at least a part of a plurality of light emitting elements using the camera; maintaining, by the HMD device, brightness of at least one light emitting element recognized using the camera; and transmitting, by the HMD device, a brightness adjustment signal that enables to control brightness of at least one unrecognized light emitting element using the camera.

In the method of adjusting brightness of a light emitting element disposed in a controller device of an electronic device according to various embodiments of the disclosure, configuring a connecting position may include flickering, by the controller device, the light emitting element; and identifying, by the HMD device, a position of the controller device by detecting the flickered light emitting element.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the of the disclosure as defined by the appended claims and their equivalents.

What is claimed is:

1. An electronic device comprising:
    a controller device; and
    a head-mounted display (HMD) device wirelessly connected to the controller device,
    wherein the controller device comprises:
        a first communication circuit,
        a light emitting element, and
        a first processor configured to control brightness of the light emitting element based on a brightness adjustment signal received from the HMD device,
    wherein the HMD device comprises:
        a second communication circuit,
        a memory,
        a sensor configured to measure external illuminance, and
        a second processor configured to:
            obtain external illuminance measured by the sensor, and
            transmit a brightness adjustment signal for adjusting brightness of the light emitting element of the controller device to the controller device using the second communication circuit based on the obtained external illuminance,
    wherein an initial brightness value of the light emitting element that distinguishes the controller device from other objects according to an arbitrary external illuminance is stored in the memory, and
    wherein the obtaining of the external illuminance prior to the transmission of the brightness adjustment signal for adjusting brightness of the light emitting element is based on the initial brightness value of the light emitting element.

2. The electronic device of claim 1,
    wherein the HMD device further comprises a camera, and
    wherein the second processor is further configured to:
        measure a distance to the controller device using the camera, and transmit the brightness adjustment signal further based on the measured distance.

3. The electronic device of claim 1,
wherein the first processor is further configured to adjust brightness of the light emitting element to a maximum value when configuring a connecting position of the controller device, and
wherein the second processor is further configured to detect brightness of the light emitting element adjusted to the maximum value to identify a position of the controller device.

4. The electronic device of claim 3, wherein the second processor is further configured to:
measure external illuminance using the sensor further based on the identified position of the controller device, and
transmit a brightness adjustment signal by acquiring the measured external illuminance.

5. The electronic device of claim 3, wherein the second processor is further configured to:
identify an attribute of a content being executed, and
transmit the brightness adjustment signal in the case of a predetermined first attribute.

6. The electronic device of claim 3, wherein the second processor is further configured to:
identify an attribute of a content being executed, and
maintain brightness of the light emitting element of the controller device at the maximum value in the case of a predetermined second attribute.

7. The electronic device of claim 1,
wherein the controller device comprises a plurality of light emitting elements, and
wherein the first processor is further configured to adjust brightness of at least a part of the plurality of light emitting elements based on the brightness adjustment signal.

8. The electronic device of claim 7, wherein the first processor is further configured to turn off at least a part of the plurality of light emitting elements based on the brightness adjustment signal.

9. The electronic device of claim 2,
wherein the controller device comprises a plurality of light emitting elements, and
wherein the second processor is further configured to:
recognize at least a part of the plurality of light emitting elements using the camera, and
transmit a brightness adjustment signal that enables to maintain brightness of at least one light emitting element recognized using the camera and to adjust brightness of at least one unrecognized light emitting element.

10. The electronic device of claim 3,
wherein the first processor is further configured to flicker the light emitting element when configuring a connecting position of the controller device, and
wherein the second processor is further configured to detect the flickered light emitting element to identify a position of the controller device.

11. A method of adjusting brightness of a light emitting element disposed in a controller device of an electronic device,
wherein the electronic device comprises a head-mounted display (HMD) device and the controller device wirelessly connected to the HMD device, and
wherein the method comprises:
storing, by the HMD device, an initial brightness value of the light emitting element that distinguishes the controller device from other objects according to an arbitrary external illuminance in a memory,
acquiring, by the HMD device, external illuminance,
transmitting, by the HMD device, a brightness adjustment signal for adjusting brightness of the light emitting element based on the acquired external illuminance, and
controlling, by the controller device, brightness of the light emitting element by receiving the transmitted brightness adjustment signal, and
wherein the acquiring of the external illuminance prior to the transmission of the brightness adjustment signal for adjusting brightness of the light emitting element is based on an initial brightness value of the light emitting element.

12. The method of claim 11, wherein the transmitting of the brightness adjustment signal comprises:
measuring, by the HMD device, a distance to the controller device using a camera; and
transmitting, by the HMD device, a brightness adjustment signal using a communication circuit further based on the measured distance.

13. The method of claim 11, further comprising configuring, by the HMD device, a connecting position of the controller device,
wherein the configuring of the connecting position comprises:
adjusting, by the controller device, brightness of the light emitting element to a maximum value, and
identifying, by the HMD device, a position of the controller device by detecting brightness of the light emitting element adjusted to the maximum value.

14. The method of claim 13, wherein the transmitting of the brightness adjustment signal comprises:
measuring, by the HMD device, external illuminance using a sensor further based on the identified position of the controller device; and
transmitting, by the HMD device, the brightness adjustment signal by acquiring the measured external illuminance.

15. The method of claim 13, wherein the transmitting of the brightness adjustment signal comprises:
identifying, by the HMD device, an attribute of an content being executed; and
transmitting, by the HMD device, the brightness adjustment signal in the case that the identified attribute of the content is a predetermined first attribute.

16. The electronic device of claim 2,
wherein the camera is a separate sensor from the illuminance sensor,
wherein, when determining distance and brightness, the camera only measures distance and the illuminance sensory only measures illuminance.

17. A computer readable storage medium with instructions stored thereon, the instructions executed by a controller device perform a method of adjusting brightness of a light emitting element disposed in controller device of an electronic device,
wherein the electronic device comprises a head-mounted display (HMD) device and the controller device wirelessly connected to the HMD device, and
wherein the method comprises:
storing, by the HMD device, an initial brightness value of the light emitting element that distinguishes the controller device from other objects according to an arbitrary external illuminance in memory,
acquiring, by the HMD device, external illuminance, transmitting, by the HMD device, a brightness adjustment signal for adjusting brightness of the light emitting element based on the acquired external illuminance, and controlling, by the controller device, brightness of the light emitting element by receiving the transmitted brightness adjustment signal, and wherein the acquiring of the external illuminance prior to the transmission of the brightness adjustment signal for adjusting brightness of the light emitting element is based on an initial brightness value of the light emitting element.

\* \* \* \* \*